(12) United States Patent
Groleau

(10) Patent No.: US 10,738,497 B1
(45) Date of Patent: Aug. 11, 2020

(54) NESTED WIND TOWER ASSEMBLY

(71) Applicant: PECOS WIND POWER, INC., Somerville, MA (US)

(72) Inventor: Joshua Groleau, Somerville, MA (US)

(73) Assignee: Pecos Wind Power, Inc., Somerville, MA (US)

( * ) Notice: Subject to any disclaimer, the term of this patent is extended or adjusted under 35 U.S.C. 154(b) by 0 days.

(21) Appl. No.: 16/177,063

(22) Filed: Oct. 31, 2018

Related U.S. Application Data

(60) Provisional application No. 62/579,306, filed on Oct. 31, 2017, provisional application No. 62/579,329, filed on Oct. 31, 2017.

(51) Int. Cl.
| | | |
|---|---|---|
| *E04H 12/18* | (2006.01) | |
| *E04H 5/02* | (2006.01) | |
| *E04H 12/34* | (2006.01) | |
| *F03D 80/80* | (2016.01) | |

(52) U.S. Cl.
CPC ............ *E04H 12/182* (2013.01); *E04H 5/02* (2013.01); *E04H 12/345* (2013.01); *F03D 80/80* (2016.05)

(58) Field of Classification Search
CPC ..... E04H 12/182; E04H 12/345; E04H 12/34; H01Q 1/10
See application file for complete search history.

(56) References Cited

U.S. PATENT DOCUMENTS

| | | | |
|---|---|---|---|
| 2,363,106 A | | 11/1944 | Woolslayer et al. |
| 3,248,831 A | * | 5/1966 | Jones ............... E04H 12/182 29/897.33 |
| 3,284,972 A | * | 11/1966 | Werner ............. E04H 12/182 52/118 |

(Continued)

FOREIGN PATENT DOCUMENTS

| | | |
|---|---|---|
| DE | 2806081 | 8/1979 |
| GB | 2472103 | 1/2011 |
| WO | WO-2012153137 | 11/2012 |

OTHER PUBLICATIONS

Christner B., "Erecting a 10 KW Wind Turbine on a 60 It. Tower" <https://www.youtube.com/watch?v=t8jtlg0ULMC> Au.

(Continued)

*Primary Examiner* — Brian D Mattei
(74) *Attorney, Agent, or Firm* — Nutter McClennen & Fish LLP

(57) ABSTRACT

A method assembles a wind turbine in a non-vertical orientation. The turbine has a nested wind tower with a plurality of tower sections, including a first inner tower section radially inward of an outer tower section. Each of the tower sections has a wall with an inner surface and an outer surface. The first inner tower section has a connection interface at or near its bottom end, and the outer tower section has a counterpart connection interface at or near its top end. The tower has a friction reduction member configured to reduce friction between the first inner tower section and the outer tower section as the first inner tower section is (Continued)

extracted in a non-vertical orientation. The first inner tower section is extracted in a telescoping manner until the connection interface contacts the counterpart connection interface. The method also secures the connection interface and the counterpart connection interface together.

21 Claims, 14 Drawing Sheets

(56) References Cited

U.S. PATENT DOCUMENTS

| | | | | |
|---|---|---|---|---|
| 3,715,852 A * | 2/1973 | Koga | ............... | E04H 12/345 29/469 |
| 3,803,780 A | 4/1974 | Donnally | | |
| 4,151,534 A * | 4/1979 | Bond | ............... | H01Q 1/1235 343/883 |
| 4,269,395 A | 5/1981 | Newman et al. | | |
| 4,272,929 A | 6/1981 | Hanson | | |
| 4,364,710 A | 12/1982 | Campbell | | |
| 4,590,718 A | 5/1986 | Angeloff | | |
| 4,598,509 A * | 7/1986 | Woolslayer | ............. | E02B 17/00 52/115 |
| 5,572,837 A * | 11/1996 | Featherstone | ............. | B60P 3/18 52/118 |
| 6,582,105 B1 | 6/2003 | Christensen | | |
| 6,782,667 B2 * | 8/2004 | Henderson | ............ | E04H 12/182 52/116 |
| 6,955,025 B2 | 10/2005 | Dehlsen et al. | | |
| 7,574,832 B1 * | 8/2009 | Lieberman | ............. | E04H 12/10 212/350 |
| 8,042,306 B2 | 10/2011 | Jolly | | |
| 8,046,970 B2 | 11/2011 | Diniz et al. | | |
| 8,295,033 B2 | 10/2012 | Van Straten | | |
| 8,341,918 B2 | 1/2013 | Jolly | | |
| 8,598,724 B2 * | 12/2013 | Ulanovskiy | ............. | E02D 27/42 290/44 |
| 8,919,074 B2 | 12/2014 | Meyer et al. | | |
| 8,955,264 B2 * | 2/2015 | Edwards | ................ | E04H 12/34 52/118 |
| 8,959,870 B2 | 2/2015 | Schmidt | | |
| 8,960,615 B1 * | 2/2015 | Johnson | ................. | F03D 13/10 248/188.7 |
| 9,140,029 B2 | 9/2015 | Jones et al. | | |
| 9,371,178 B2 | 6/2016 | Frederiksen | | |
| 9,388,599 B2 | 7/2016 | Homsi | | |
| 9,441,612 B2 | 9/2016 | Haar | | |
| 9,509,036 B2 | 11/2016 | Garmong et al. | | |
| 9,650,802 B2 | 5/2017 | Anderson et al. | | |
| 9,856,671 B2 | 1/2018 | Jones et al. | | |
| 2006/0213145 A1 | 9/2006 | Haller | | |
| 2007/0145181 A1 | 6/2007 | Pedersen | | |
| 2008/0196758 A1 * | 8/2008 | McGuire | ................ | H02S 10/12 136/245 |
| 2010/0060012 A1 | 3/2010 | Reitz | | |
| 2010/0207452 A1 * | 8/2010 | Saab | .............. | F03D 9/255 307/65 |
| 2010/0313497 A1 | 12/2010 | Jensen | | |
| 2011/0016804 A1 * | 1/2011 | Howard | ................ | E04H 12/20 52/146 |
| 2011/0176256 A1 * | 7/2011 | Van Straten | ............ | F03D 9/007 361/601 |
| 2011/0185647 A1 | 8/2011 | Diniz et al. | | |
| 2011/0255934 A1 | 10/2011 | Delgado et al. | | |
| 2012/0007365 A1 | 1/2012 | Harrison et al. | | |
| 2012/0124833 A1 | 5/2012 | Arendt et al. | | |
| 2012/0228442 A1 * | 9/2012 | Clifton | ................... | F24S 25/10 248/163.1 |
| 2012/0308307 A1 | 12/2012 | Del Campo y Ruiz De Almodovar et al. | | |
| 2013/0056991 A1 | 3/2013 | Petersen et al. | | |
| 2013/0091784 A1 * | 4/2013 | Schmidt | ................ | E04H 12/182 52/115 |
| 2013/0104376 A1 | 5/2013 | Pedersen | | |
| 2013/0134717 A1 | 5/2013 | Tull De Salis et al. | | |
| 2013/0186013 A1 * | 7/2013 | Jones | ................... | E04H 12/342 52/126.1 |
| 2014/0231284 A1 | 8/2014 | Ansari | | |
| 2014/0311085 A1 * | 10/2014 | Fernandez Gomez | ..................... | E04H 12/12 52/745.18 |
| 2014/0339380 A1 | 11/2014 | Barrett et al. | | |
| 2015/0198140 A1 | 7/2015 | Sigurdsson | | |
| 2015/0300314 A1 | 10/2015 | Van Der Zee et al. | | |
| 2015/0308140 A1 * | 10/2015 | Clifton | ................... | F03D 9/007 248/346.2 |
| 2015/0345473 A1 | 12/2015 | Bardia | | |
| 2016/0060893 A1 * | 3/2016 | Roodenburg | ............. | E21B 7/02 52/123.1 |
| 2016/0060894 A1 * | 3/2016 | Campbell | ............... | E04H 12/34 414/23 |
| 2016/0108893 A1 * | 4/2016 | Agtuca | ................... | F03D 13/40 290/44 |
| 2016/0261019 A1 * | 9/2016 | Garmong | ............. | H01Q 1/3216 |
| 2016/0301128 A1 * | 10/2016 | Blackwelder | ............ | H01Q 1/32 |
| 2016/0376806 A1 * | 12/2016 | Vetesnik | ................ | F16M 11/42 52/121 |
| 2016/0377048 A1 | 12/2016 | Caruso et al. | | |
| 2017/0152833 A1 | 6/2017 | Keller et al. | | |
| 2017/0211548 A1 | 7/2017 | Van Der Zee | | |
| 2017/0218915 A1 | 8/2017 | Wilmot et al. | | |
| 2017/0370346 A1 | 12/2017 | Botwright | | |
| 2017/0370347 A1 * | 12/2017 | Davis | ................. | E04H 12/2246 |
| 2018/0030788 A1 | 2/2018 | Reddy et al. | | |
| 2018/0112431 A1 | 4/2018 | Jones et al. | | |
| 2018/0274258 A1 * | 9/2018 | Newman | ............. | E04B 1/34352 |
| 2018/0347224 A1 * | 12/2018 | Barber | ................. | E04H 12/345 |
| 2019/0032639 A1 | 1/2019 | Thomsen et al. | | |
| 2019/0093382 A1 * | 3/2019 | Sauber | ................. | E04H 12/345 |
| 2019/0106945 A1 * | 4/2019 | Basile | ................... | E04H 12/345 |

OTHER PUBLICATIONS

Arewindtowers, "Vertical Gin Pole—Wind Turbine Tower Raising System" (Sep. 27, 2011) <https://www.youtube.com/watch?v=vEEJX29IP50>.
Arewindtowers, "Tilt Up Wind Tower—Motorized Screw Jack Non-hydraulic Raising System" (Jul. 13, 2011) <https://www.youtube.com/watch?v=pcEPrx44La0>.
Xant, "The REIDS micro-grid demonstrator" (Oct. 2017) http://xant.com/reids-micro-grid-demonstrator/.
Eocycle, "Tilt-up tower technology" (Apr. 25,2016) https://www.youtube.com/watch?v=j0hmUD63XC8.
Vergnet Wind Turbines, Manuel, 8 pages. <http://www.vergnet.com/wp-content/uploads/2016/01/DC-11-00-01-EN GEV MP-C 275 kW.pdf >.

* cited by examiner

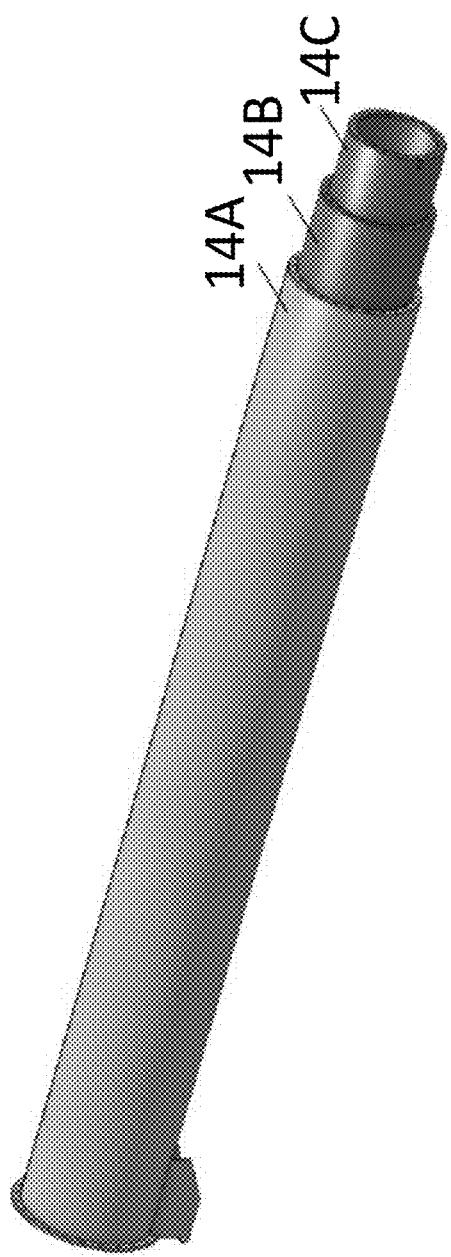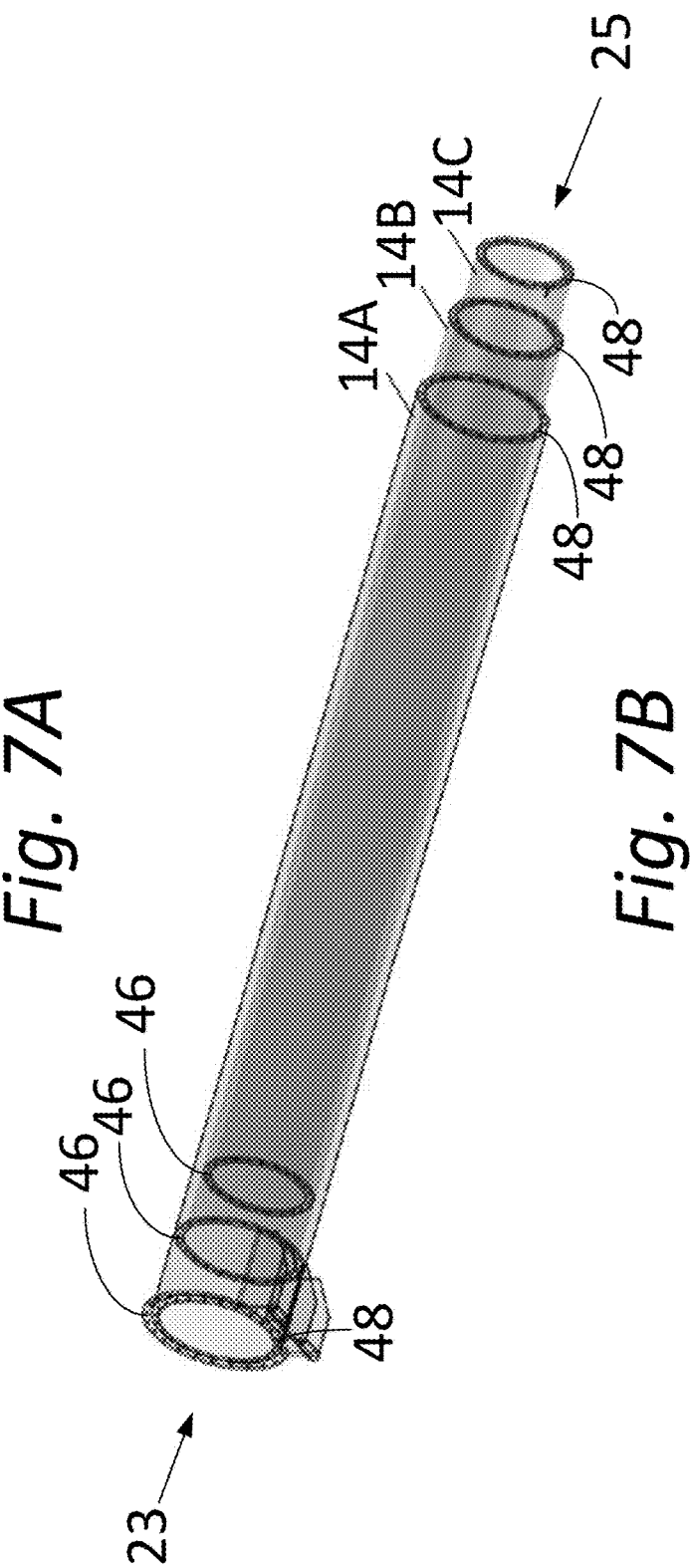

US 10,738,497 B1

NESTED WIND TOWER ASSEMBLY

PRIORITY

This patent application claims priority from provisional U.S. patent application No. 62/579,306, filed Oct. 31, 2017, entitled "Telescoping tower for use in wind turbines that are assembled horizontally," and provisional U.S. patent application No. 62/579,329, filed Oct. 31, 2017, entitled "A method for tilt-up installation of wind turbines using a reusable tilt-up fixture," the disclosures of which are incorporated herein, in their entireties, by reference.

FIELD OF THE INVENTION

The invention generally relates to wind turbines and, more particularly, the invention relates to assembling and installing wind turbines.

BACKGROUND OF THE INVENTION

Interest in renewable energy is steadily increasing. One such source of renewable energy are wind turbines. Wind turbines come in a variety of sizes, from large industrial size wind turbines (e.g., the GE 1.5 megawatt model), to individual consumer sizes that may be used to power a micro-grid. Depending on size, wind turbines are shipped, assembled, and installed using various methods.

SUMMARY OF VARIOUS EMBODIMENTS

In accordance with one embodiment of the invention, a method assembles a wind turbine. The method provides a nested wind tower in a non-vertical orientation. The nested wind tower has a plurality of tower sections including a first inner tower section radially inward of an outer tower section. Each of the tower sections has: (i) a wall with an inner surface and an outer surface, and (ii) a bottom end and a top end. The first inner tower section has a connection interface at or near its bottom end, and the outer tower section has a counterpart connection interface at or near its top end. The tower has a friction reduction member configured to reduce friction between the first inner tower section and the outer tower section as the first inner tower section is extracted in a non-vertical orientation. The method extracts the first inner tower section from the outer tower section in a telescoping manner until the connection interface contacts the counterpart connection interface. The method also secures the connection interface and the counterpart connection interface together.

In some embodiments, the connection interface includes an external flange and the counterpart connection interface includes an internal flange. Furthermore, the friction reduction member may be attached to the external flange. Among other things, the friction reduction member is configured to reduce frictional contact with the inner surface of the outer tower section.

The method may also form an assembled wind turbine by attaching a nacelle and blades to the wind tower while it is in the horizontal or substantially horizontal orientation. The method may also tilt up the assembled wind turbine to a vertical orientation. To that end, the assembled wind turbine may be tilted up using hydraulic cylinders. Additionally, or alternatively, the assembled wind turbine may be tilted up using a gin pole.

The method may also tension a tension member that is attached within a strike zone of the assembled wind turbine. Accordingly, when assembled wind turbine is tilted-up, the tension member counteracts a bending moment caused by the weight of the assembled turbine.

The method may also mount a fixture to an outermost section of the wind tower so that the outermost section is suspended by the fixture. The fixture is configured to distribute force along the tower when it is attached to a hinge and tilted up using a force generating mechanism. In some embodiments, at least four corners of the fixture have corner castings. The method may ship the main body and the nested tower, attached, to a worksite.

Each of the sections may be conically shaped and taper towards the top end. In some embodiments, the connection interface comprises a frictional contact surface between the inner wall of the outer section and the outer wall of the inner section. Additionally, or alternatively, the friction reduction member comprises a roller, a bearing, a greased skid, and/or a low friction plastic.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 7A schematically shows the tower of FIG. 6 with nested sections partially extracted in accordance with illustrative embodiments of the invention.

FIG. 7B schematically shows a translucent view of the tower of FIG. 7A.

DESCRIPTION OF ILLUSTRATIVE EMBODIMENTS

In illustrative embodiments, a fixture assists with tilt-up installation of wind turbine towers. The fixture distributes pressure at or near the base of the wind tower and within a strike zone of the blades of the wind turbine. This distribution of pressure preferably mitigates and/or prevents bending moment in the tower that may otherwise be caused during tilt-up installation. Furthermore, in some embodiments, the wind tower is shipped in a nested position, with incrementally smaller sections of the wind tower nested within larger portions. The nested sections have connection interfaces that allow tower assembly in a telescoping manner. Furthermore, in some embodiments, the fixture provides convenient single unit shipping with the tower. For example, the fixture may suspend the tower, and have corner castings positioned and sized to match standard shipping containers. Details of illustrative embodiments are discussed below.

Figure 1:
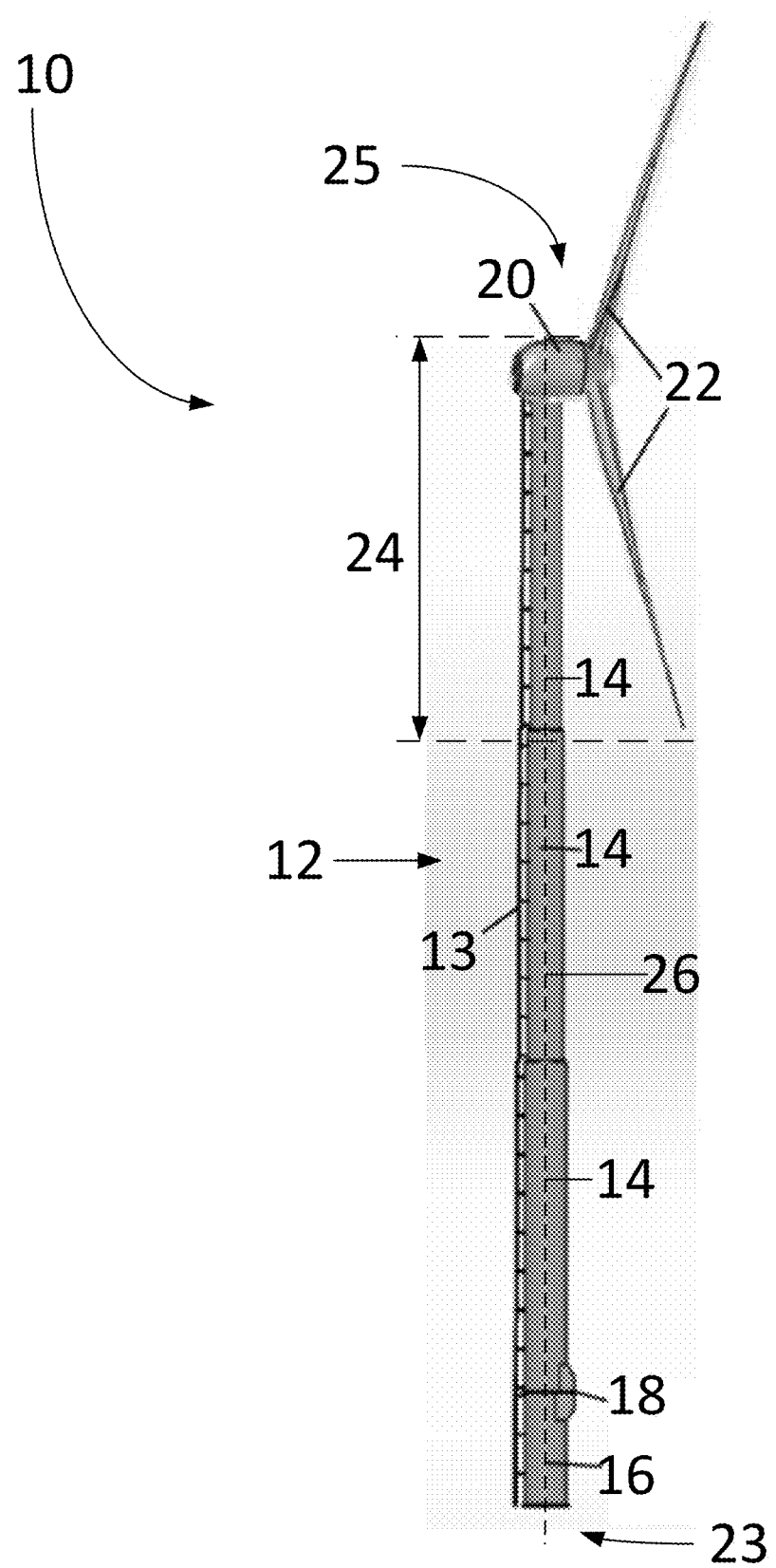
FIG. 1 schematically shows an assembled and installed wind turbine in accordance with illustrative embodiments of the invention.

FIG. 1 schematically shows an assembled and installed wind turbine 10 in accordance with illustrative embodiments of the invention. The wind turbine 10 includes a tower 12 manufactured in a number of sections 14. In illustrative embodiments, the sections 14 are manufactured and sized so that they can be nested within one another. Generally, towers 12 come in one, two, three, or more sections 14. The tower 12 may have an integrated ladder 13 that provides access to the top of the tower (e.g., for maintenance). A base 16 at the bottom end 23 of the wind tower 12 contacts the ground or foundation.

The base 16 supports the tower 12 as it is installed (e.g., tilted up). Generally, the base 16 is mounted to a foundation (not shown). As known by those of skill in the art, there are a few different foundations. Generally, the foundation is made of concrete and rebar buried under the ground. A foundation cap sticks out of the ground, and the base 16 attaches directly to the foundation cap. The base 16 in turn may be connected to the tower sections 14 by a hinge 18. However, in some embodiments the tower sections 14 may attach directly to the foundation cap without the base 16 (e.g., via hinge 18 connected to the foundation cap). The hinge 18 is used in the tilt-up installation procedure.

The top end 25 of the tower 12 has a nacelle 20 coupled to a hub with radially extending blades 22 of the turbine 10. The nacelle 20 houses the generating components of the wind turbine 10 and includes, for example, the generator, gearbox, drive train, and brake assembly (not visible). When the blades 22 rotate (e.g., because of wind), the components inside of the nacelle 20 generate power. As known by those in the art, wind power generated by the turbine 10 is proportional to the square of the blade 22 length. Illustrative embodiments aim to maximize the length of the blades 22 without sacrificing structural integrity, hitting the ground, or destroying supports that keep the tower 12 upright. Generally, the length of the blades 22 is relative to the length of the tower 12. Frequently, the length of each blade 22 is between about 15% to about 40% of the length of the tower 12. A strike zone 24 exists in the area where the blades 22 may make contact when the turbine 10 is fully assembled and in operation (e.g., a telescoping tower 12 is fully extended). In some embodiments, the strike zone includes the tower 12 and/or components affixed to the tower. This area is referred to as the "strike zone" 24 of the blades 22 and is discussed further below in additional detail.

As the direction of the wind changes, the nacelle 20 rotates to capture that wind power (e.g., around the longitudinal axis 26 of the tower 12). As known to those of skill in the art, this rotation is referred to as "yaw." Yaw systems allow the wind turbine 10 to capture the wind power as it changes directions. The blades 22 of the turbine 10 move with the nacelle 20 as it yaws. Accordingly, the strike zone 24 of the blades 22 may be all around the tower 12 (i.e., 360 degrees), and not limited to the initial orientation shown in FIG. 1.

Traditional wind turbine installation mechanisms, such as gin poles, which remain attached to the tower 12, are not attached within the strike zone 24. This is because during the operation of the wind turbine 10, the blades 22 would strike the attachment zone in the strike zone 24 and result in catastrophic failure. Because prior art gin poles known to the inventor attach to the tower 10 at a lower point (i.e., beneath the strike zone 24), the bending moment on the tower 12 (i.e., the moment at the top of the tower 12 near the nacelle 20) during tilt-up is considerable. This moment is compounded not only by the weight of the tower, but also by the weight of the nacelle 20, its internal components, and the blades 22.

Figure 2:
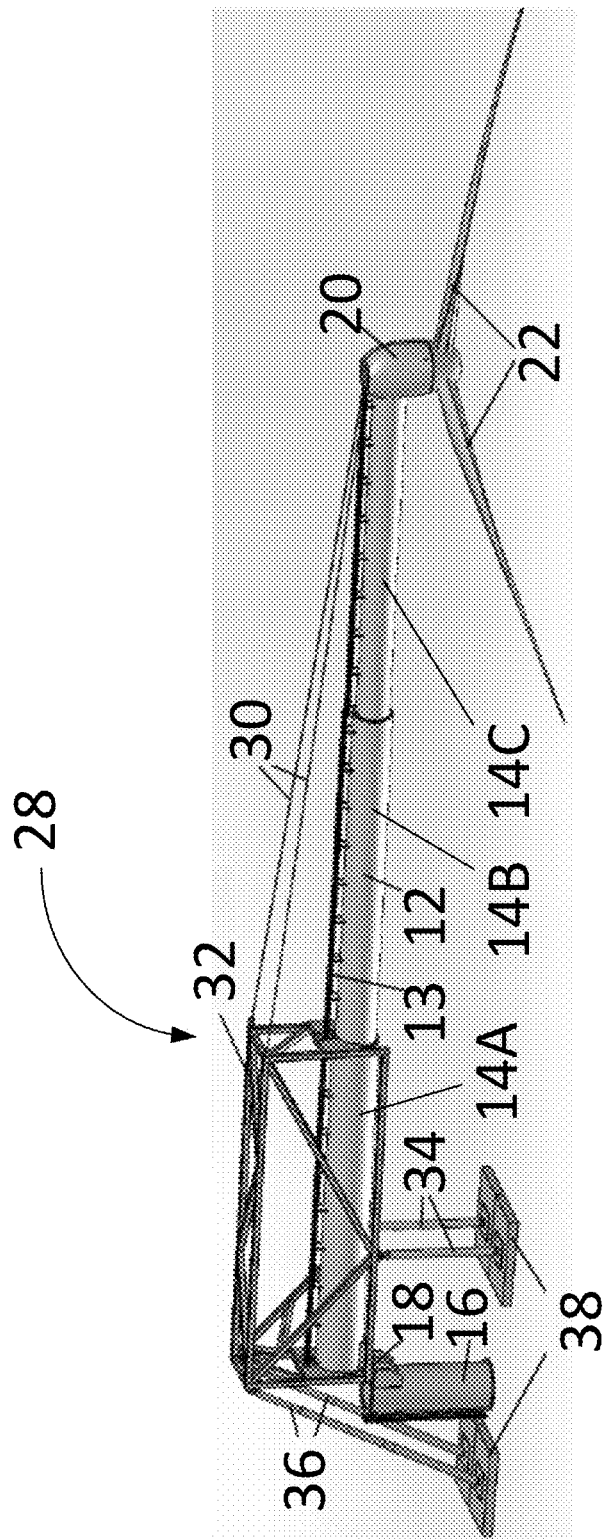
FIG. 2 schematically shows a fixture used to install the wind turbine in accordance with illustrative embodiments of the invention.

FIG. 2 schematically shows a fixture 28 configured to install the wind turbine 10 in accordance with illustrative embodiments of the invention. Many small wind turbines 10 utilize a tilt-up installation procedure. Typically, small wind turbines 10 are tilted-up via hydraulics, winches, or pulleys that are mounted directly to the turbine's tower 12. This tilt-up process creates large moments on the tower 12 caused by the extended, cantilevered, length of the tower 12 and the weight of the nacelle 20, internal components, and the blades 22. Accordingly, the tower 12 (e.g., of typical small wind turbines) is structurally reinforced to withstand the high stresses from the tilt-up process. In some embodiments, the fixture 28 distributes the force from the tilt-up process to at least two points (one near the top of the tower 12 and one near the base 16) and mitigates bending moments in the tower 12. For example, the fixture 28 may have an attachment point at the lowest section 14A of the tower 12, and another attachment point near the top of the tower 12.

In illustrative embodiments, the fixture 28 may be reused for many turbine 10 installations. By minimizing stress in the tower 12, the fixture 28 enables the turbine 10 to be built more economically and with less steel. Additionally, the fixture 28 allows for installation of larger and heavier wind turbines 10 using a tilt-up process.

Generally, the installation process begins with assembling the turbine 10 in the horizontal orientation shown in FIG. 2. During assembly, the nacelle 20 and the blades 22 are supported by a temporary assembly stand (shown in FIG. 15) located below the nacelle 20. After the various sections 14 (includes lower section 14A, middle section 14B, and top section 14C) are secured to one another, the turbine 10 is installed in its upright orientation. To install the turbine 10 in the upright orientation, the fixture 28 is positioned onto the turbine 10 using a forklift, crane, or other material handling equipment. The fixture 28 may be attached (e.g., bolted) to any portion of the tower 12 (e.g., the flanges of the lowest most section 14A of the wind turbine tower 12).

In some embodiments, the fixture 28 has tension members 30 (e.g., cables, chains, rods, slings, or other tension carrying devices) tensioned between the main body 32 of the fixture 28 and the tower 12. In preferred embodiments, the tension member 30 is attached to the tower 12 at a position within the strike zone 24. Contrary to prior art installation procedures, the tension member 30 is attached to the fixture 28 (instead of the ground), which is attached to the tower 12, and is removable with the fixture 28 after the installation process. For the sake of convenience, discussion of the tension member 30 will refer to "cables 30", but it should be understood that discussion of cables 30 applies to any type of tension member 30 in the art.

The cables 30 are tensioned until they support the mass of the blades 22 and nacelle 20. The tensioning removes load on the temporary assembly stand underneath the nacelle 20 so that it may be removed. The tension in the cables 30 also minimizes bending moment in the tower 12. The turbine 10 begins to tilt up to vertical position as pressure from one or more hydraulic cylinders 34 and/or 36 increases to overcome moment at the hinge 18. The turbine 10 is tilted from its horizontal position shown in FIG. 2 to its vertical position shown in FIG. 3.

Although the tower 12 and turbine 10 are shown and described in a horizontal orientation, a person of skill in the art understands that the term horizontal does not require a perfectly horizontal tower 12 and/or turbine 10. Indeed, the horizontal orientation is intended to cover orientations that are non-vertical, i.e., that are not in the orientation of a normally installed wind turbine 10. Thus, the term "horizontal" includes orientations where the tower may be angled off horizontal, or bent (e.g., because of the bending moment) out of a horizontal orientation.

In some embodiments, the base 16 provides added height so that the front hydraulic cylinders 34 may be easily positioned underneath the tower. In illustrative embodiments, the hydraulics 34 and/or 36 use the ground as the reaction force. Using the foundation as the reaction force puts a lot of load on the foundation, which may cause damage to the foundation. Accordingly, illustrative embodiments avoid damaging the foundation by using the ground as the reaction force.

In some embodiments, rear hydraulic cylinders 36 are attached to pressure relief valves (not shown) and provide preload that ensures a smooth transition of the turbine's 10 center of gravity over the pivot point (e.g., at hinge 18). The rear hydraulic cylinders 36 also ensure that the turbine 10 smoothly and steadily settles in its vertical position shown in FIG. 3.

Figure 3:
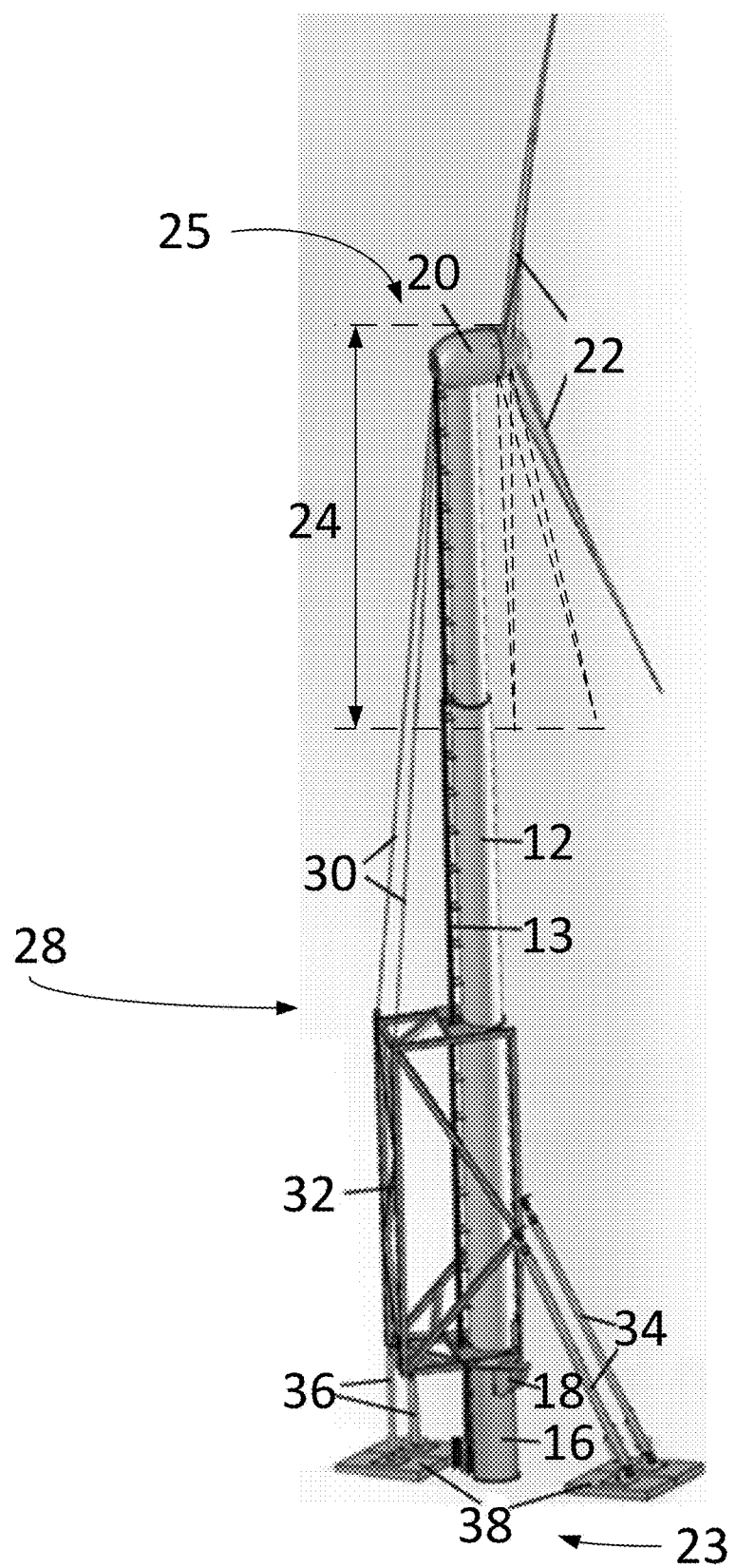
FIG. 3 schematically shows the turbine of FIG. 2 after installation using the fixture in accordance with illustrative embodiments of the invention.

FIG. 3 schematically shows the turbine 10 of FIG. 2 after installation using the fixture 28 in accordance with illustrative embodiments of the invention. When the turbine 10 is initially installed, the cables 30 are attached within the strike zone 24. The hinge 18 is closed and the flanges between the tower base 16 and the tower 12 are bolted together to prevent opening. All loading on the tower 12 is now supported by the turbine's 10 foundation (not shown). The cables 30 are then de-tensioned and removed. Thus, when the turbine 10 is in operation, there is not a catastrophic failure caused by the blades 22 contacting the cables 30 within the strike zone 24. Accordingly, illustrative embodiments have blades 22 that may be proportionally longer than similarly sized towers 12 of the prior art. This is because the cables 30 are removable after installation, and thus, not within the strike zone 24 during operation of the turbine 10.

Although the strike zone 24 is shown as being below the nacelle 20, it does include the area above the nacelle 20. For example, the tower 12 could extend, or have an attachment that extends, above the nacelle 20. In some embodiments, the cables 30 could attach to the tower 12 or the attachment that is above the nacelle 20.

As described previously, an advantage of attaching the cables 30 within the strike zone 24 is that the bending moment at the top end 25 of the tower 12 is substantially reduced. In contrast, prior art tilt-up methods known to the inventor have a large cantilever that create a larger bending moment. This bending moment is increased by longer and heavier blades 22. Illustrative embodiments significantly reduce the bending moment produced by the weight of the turbine 12 during tilt-up. Accordingly, illustrative embodiments may use longer blades 22 than the prior art without requiring additional reinforcement of the structural integrity of the tower 12. While prior art gin poles could be used with longer blades 22 by moving the attachment point towards the ground end 23, the bending moment caused by the cantilevered tower would require additional reinforcement of the structural integrity of the tower 12.

To complete the installation process, the hydraulic cylinders 34 and 36 are removed from the tilt-up fixture 28. The tilt-up fixture 28 and dunnage 38 may be removed from the tower 12. The turbine 10 installation is then complete and the turbine 10 is ready for operation. The hydraulics 34 and 36, dunnage 38, and tilt-up fixture 28 may then be transported to the next project site to install another turbine 10.

While the discussion above references tilt-up procedures, the fixture 28 may also be used for tilt-down procedures (e.g., for turbine 10 decommissioning or servicing). The force required to actuate the tilt-up (or tilt-down) procedure may be provided by one or more force generating members, such as hydraulic cylinders 34 and 36, winches, hoists, gin poles, or cranes. Accordingly, the hydraulic cylinders 34 and 36 shown in the figures are for discussion purposes only, and not intended to limit illustrative embodiments of the invention.

Figure 4:
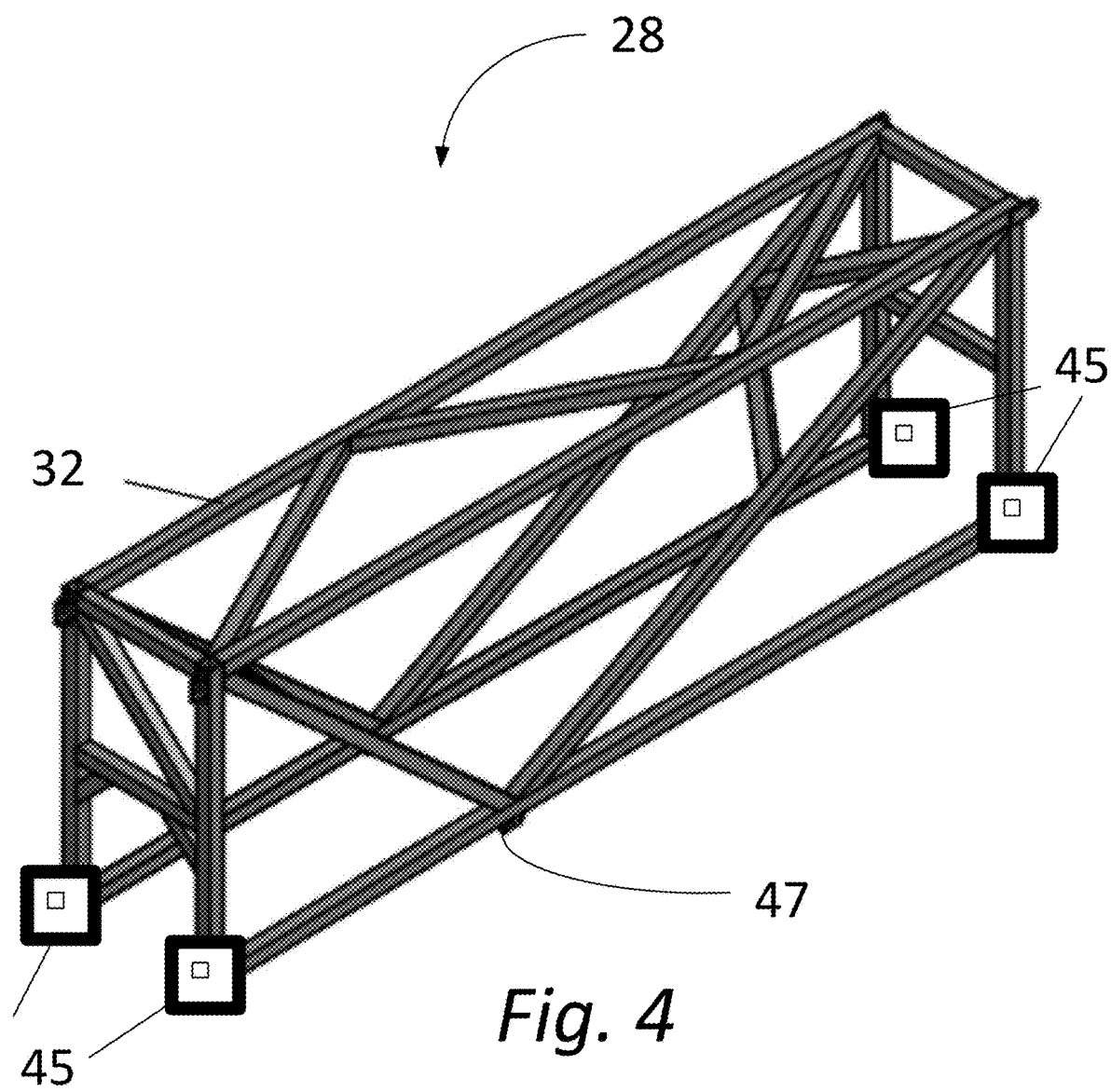
FIG. 4 schematically shows a perspective view of the tilt-up fixture in accordance with illustrative embodiments of the invention.

FIG. 4 schematically shows a perspective view of the tilt-up fixture 28 in accordance with illustrative embodiments. As described previously, the fixture 28 distributes the stress from the tilt-up process to various points along the length tower 12. However, the fixture 28 itself bears a lot of stress. Accordingly, in some embodiments, the fixture 28 may be formed from material with a high Young's modulus and flexural modulus, such as steel. Although not shown in FIG. 4, the fixture 28 may also include cables 30 that connect to the tower 12, (e.g., within the strike zone 24).

Figure 5A:
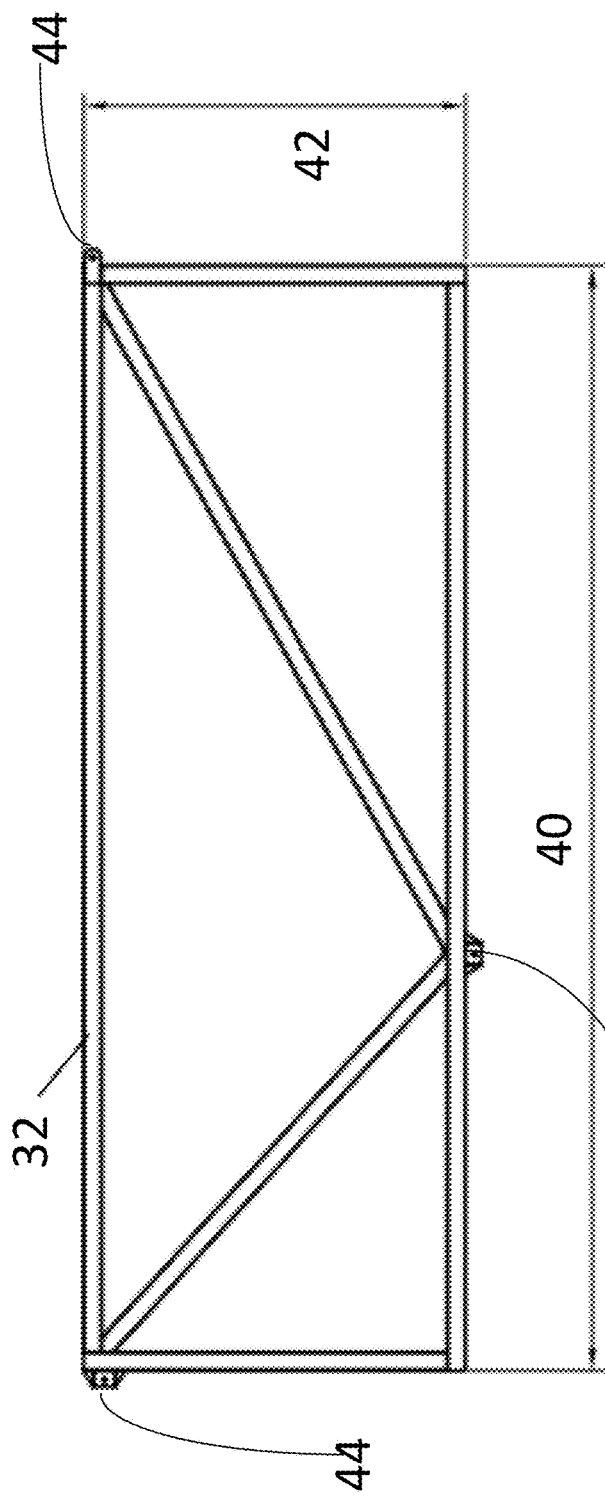
FIG. 5A schematically shows a side view of the tilt-up fixture in accordance with illustrative embodiments of the invention.
Figure 5B:
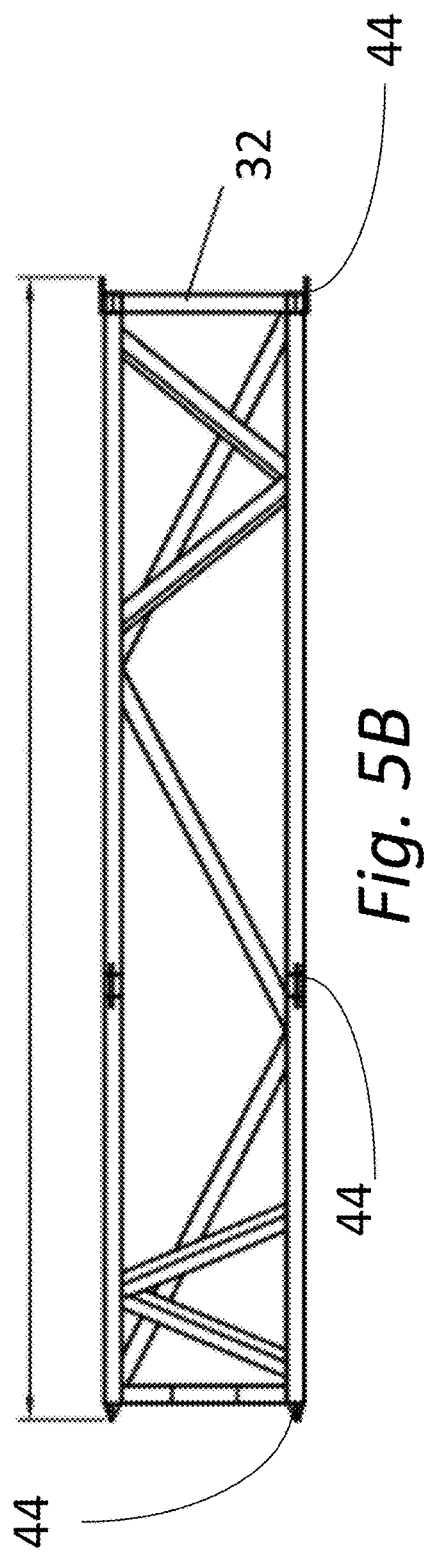
FIG. 5B schematically shows a top view of the tilt-up fixture in accordance with illustrative embodiments of the invention.

In some embodiments, the fixture 28 may include a truss as the main body 32, with the members welded, pinned, or bolted together. The truss 32 provides structural rigidity without adding a significant amount of weight to the already heavy turbine 10. The dimensions of the tilt-up fixture 28 may vary. However, some preferred embodiments have approximately the same dimensions as standard intermodal freight shipping containers. For example, as shown in FIGS. 5A-5B, the main body 32 may have a length 40 of about 480.4 inches, a height 42 of about 165.5 inches. However, with the addition of attachment members 44 for shipping and attaching a tension member 30, part of the main body 32 may have a length of about 494.4 inches. It should be understood that these dimensions are not intended to limit illustrative embodiments of the invention.

In some embodiments, the tower 12 may be shipped within the fixture 28, without requiring an additional shipping containers. To that end, attachment members 44 may be configured to attach to standard shipping containers. For example, each of the bottom and/or top corners of the main body 32 may be corner castings 45 configured to attach to standard twistlock connectors. Furthermore, the tower 12 sections 14 may be nested and shipped attached to the fixture 28. Thus, the fixture 28 may have the same footprint and the same connection points as a standard shipping container.

To allow the main body 32 to sit flat on other shipping containers, the clip 47 on the bottom edge may be removed. Furthermore, the main body 32 is configured such that the nested tower 12 fits within the volume formed by the edges of the main body 32. Thus, when the main body 32 is stacked on a shipping container, the bottom edges, rather than the wall of the tower 12, contacts the shipping container.

Although the main body 32 is described as a truss, it should be understood that the main body 32 may be formed from other configurations, such as a concave piece of steel configured to contact the tower 12. The concave piece of steel may have a radius of curvature matched to the radius of curvature of the tower 12.

The fixture 28 or portions thereof (e.g., main body 32), have dimensions that vary and are in part based on the size and weight of the supported tower 12. While some embodiments have tension members 30 that attach within the strike zone, some other embodiments may not have separate tension members 30 at all. For example, the main body 32 may be extended to attach both within the strike zone 24 and near the bottom section 14, base 16, and/or a foundation underneath the base.

Figure 6:
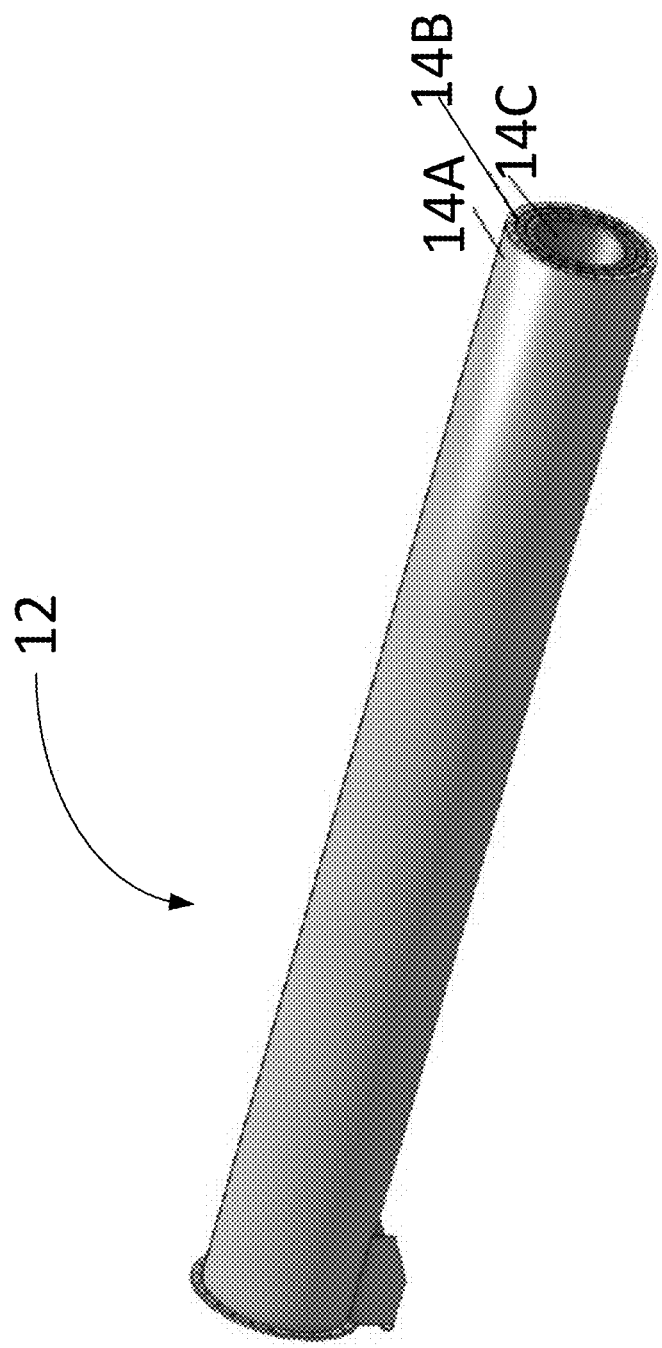
FIG. 6 schematically shows a nested tower in accordance with illustrative embodiments of the invention.

FIG. 6 schematically shows a nested tower 12 in accordance with illustrative embodiments of the invention. As shown, the tower 12 of this example has three nested sections 14A, 14B, and 14C. Section 14A is the outermost section, section 14B is the middle section, and section 14C is the innermost section. Although three sections 14A-C are shown, it should be understood that illustrative embodiments are not limited to three sections 14A-C. Indeed, one or more sections 14 may be nested.

The nested tower 12 in FIG. 6 is shown in a horizontal configuration. Although not shown here, the fixture 28 may be attached to the outermost section 14A (e.g., bolted). Accordingly, as noted above, the entire tower 12 and fixture 28 may be easily shipped together for easy assembly and installation.

FIG. 7A schematically shows the tower of FIG. 6 with nested sections 14B and 14C partially extracted in accordance with illustrative embodiments of the invention. These sections 14A-14C fit together in a telescoping manner to provide a compact shipping profile. When the nested tower 12 arrives at the installation site (e.g., a wind farm), the internal sections 14B and 14C may be extracted from their respective nesting sections 14A and 14B. To that end, a forklift, crane, or other material handling equipment may be used to pull out the pieces.

FIG. 7B schematically shows a translucent view of the tower of FIG. 7A. As can be seen, each section 14A-C has a connection interface 46 and 48 (e.g., flanges 46 and 48, male and female connectors, snap-fit buckle connection, etc.) configured to couple the sections 14 together. For the sake of convenience, discussion of the connection interfaces 46 and 48 will refer to "flange 46" and "flange 48", but it should be understood that discussion of flanges 46 and/or 48 applies to any type of connection interface in the art.

In some embodiments, each section has at least two flanges 46 and 48. One flange is an external flange 46, and the other is an internal flange 48. The external flange 46 extends radially outward of the wall of the section 14 (e.g., of the outer diameter of the section 14 if it is circular). The internal flange 48 extends radially inwardly of the wall of the section 14 (e.g., of the inner diameter of the section 14 if it is circular). As discussed in more detail below, the internal flange 48 of a larger section 14 (e.g., 14A) is configured to radially interfere with the external flange 46 of an immediately smaller section 14 (e.g., 14B), to prevent the smaller section 14 from being completely dislodged. Accordingly, smaller sections (e.g., 14B) should not unintentionally dislodge from larger sections (e.g., 14A) and fall to the ground where they may be damaged.

While each section 14A, 14B, and 14C may have one of each type of flange 46 and 48 at each end, it is possible to have more. For example, as shown in FIG. 7B, section 14A has an internal flange 48 in addition to an external flange 46 near the bottom end of the tower 12. This internal flange 48 interferes with the external flange 46 of the second section 14B, and prevents the section from accidentally being dislodged. One or more sections 14 may have an internal flange 48 and an external flange 46 on one or more ends. Furthermore, although the internal flange 48 and the external flange 46 are described as being different components, they may form a single flange that extends both radially internally of the inner diameter of the section 14 and radially externally of the of the outer diameter of the section 14.

Figure 8:
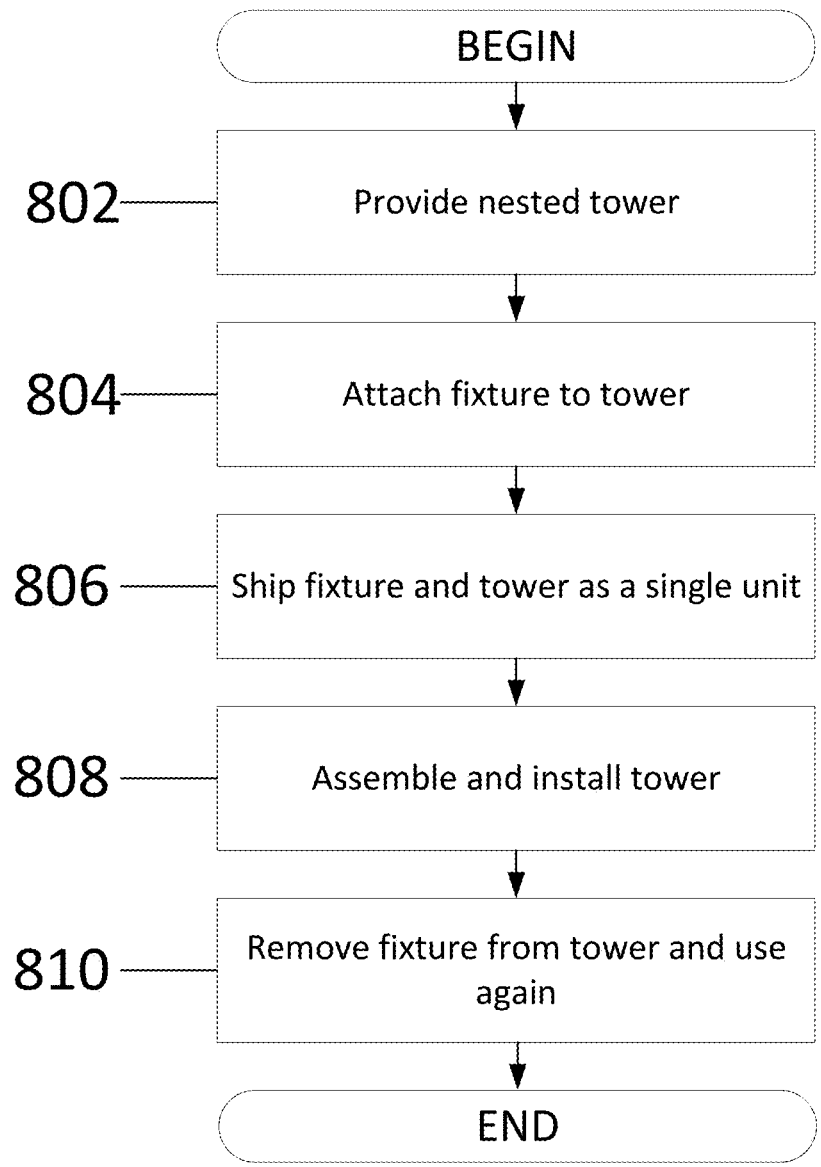
FIG. 8 shows a process of shipping the tower using the fixture in accordance with illustrative embodiments of the invention.

FIG. 8 shows a process of shipping the tower 12 using the fixture 28 in accordance with illustrative embodiments of the invention. It should be noted that this process is substantially simplified from a longer process that normally would be used to ship the tower 12. Accordingly, the process likely has other steps that those skilled in the art likely would use. In addition, some of the steps may be performed in a different order than that shown, or at the same time. Those skilled in the art therefore can modify the process as appropriate.

The process begins at step 802, which provides the nested tower 12. The tower 12 is nested to provide space savings, and to allow for shipping in a single container. Accordingly, sections 14 are manufactured and nested within one another. Preferably, each section 14 has an external flange 46 on the end nearest to the bottom end 23. Additionally, each section 14 preferably has an internal flange 48 on the end nearest the top end 23. Details regarding the nested tower 12 are discussed further below.

At step 804, the process attaches the fixture 28 to the tower 12. In some embodiments, the main body 32 is attached to the outermost section 14A (e.g., by bolting at both ends). Additionally, or alternatively, the main body 32 may be attached to the hinge 18 and/or the base 16 of the tower 12 (e.g., when the tower 12 and the fixture 28 are at the worksite). Furthermore, in some embodiments, the main body 32 may be coupled to cables 30. The innermost section 14C may have a connection interface for the cables 30. In some embodiments, the cables 30 may be attached to/couple with the section 14 (e.g., the innermost section 14C) that will put the cables 30 in the strike zone 24 upon assembly and installation. Accordingly, once the sections 14 are extracted, the cables 30 are already coupled to the strike zone 24.

At step 806, the nested tower 12 and the fixture 28 are shipped attached. The remaining wind turbine 10 components (e.g., blades, tower, nacelle, etc.), and in some embodiments, tilt-up installation equipment (e.g., fixture 28, hydraulics, etc.) may be shipped in the same container or in a different container. In addition to providing assistance with installation, the fixture 28 provides shipping convenience. Sections 14 are heavy and difficult to transport. However, as shown in FIGS. 5A-5B, the fixture 28 has a number of clips 44 (which may be corner castings 45) that allow for convenient grasping or attachment of the fixture 28 (and by extension the attached tower 12).

At step 808, the tower 12 is assembled and installed using the fixture 28. Specifically, the tower 12 is assembled horizontally, tension members 30 are connected from the fixture 28 to the strike zone 24, and the tower 12 is titled-up using the fixture. Details about the assembly and installation are discussed with reference to FIG. 9. The process then proceeds to step 810, where the fixture 28 is removed from the tower 12 (e.g., unbolted, and cables are removed) and used to install and/or ship another tower 12 at another worksite.

Accordingly, the fixture 28 is removably connectible with the tower 12. As such, removal simply requires use of tools to unbolt or otherwise remove the fixture 28 without requiring permanent change to the structure of the tower 12, such as sawing or other process requiring a force that damages or changes the tower 12 and/or the fixture 28.

Figure 9:
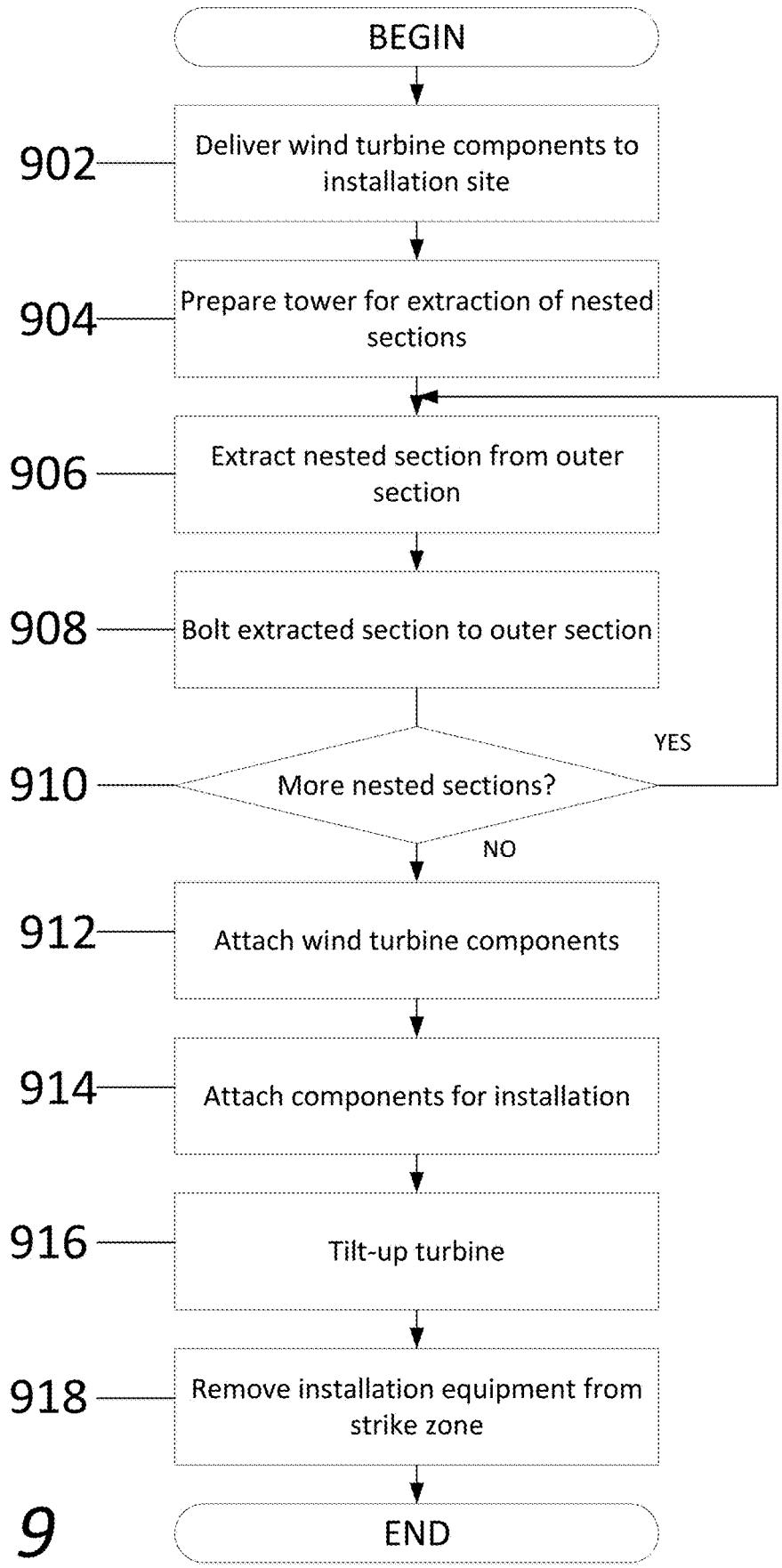
FIG. 9 shows a process of assembling and installing the nested tower in accordance with illustrative embodiments of the invention.

FIG. 9 shows a process of assembling and installing the nested tower 12 in accordance with illustrative embodiments of the invention. In a manner similar to the process of FIG. 8, this process is substantially simplified from a longer process that normally would be used to assemble the tower 12. Accordingly, the process likely has other steps that those skilled in the art likely would use. In addition, some of the steps may be performed in a different order than that shown, or at the same time. Those skilled in the art therefore can modify the process as appropriate.

The process begins at step 902, which delivers the wind turbine 10 components to the installation site (e.g., using the process described in FIG. 8). The telescoping tower 12 may be transported from the manufacturing facility to the installation site using conventional means, such as ships, trucks, rail, etc. All of the sections 14 may be nested within each other so that the entire tower 12 may fit in a single container. In some embodiments, the fixture 28 and the nested tower 12 may be shipped as a single attached piece. In some embodiments, this step 902 is optional. However, assembling the turbine 10 offsite and then transporting it to the installation site likely adds unnecessary expense and difficulty. Shipping the nested tower 12 eliminates the need to transport each section 14 individually, and thus, results in lower transportation costs. The remaining wind turbine 10 components (e.g., blades 22, tower 12, nacelle 20, etc.), and in some embodiments, tilt-up installation equipment (e.g., fixture 28, hydraulics 36 and 36, etc.) may be shipped in the same container or in a different container.

Figure 10:
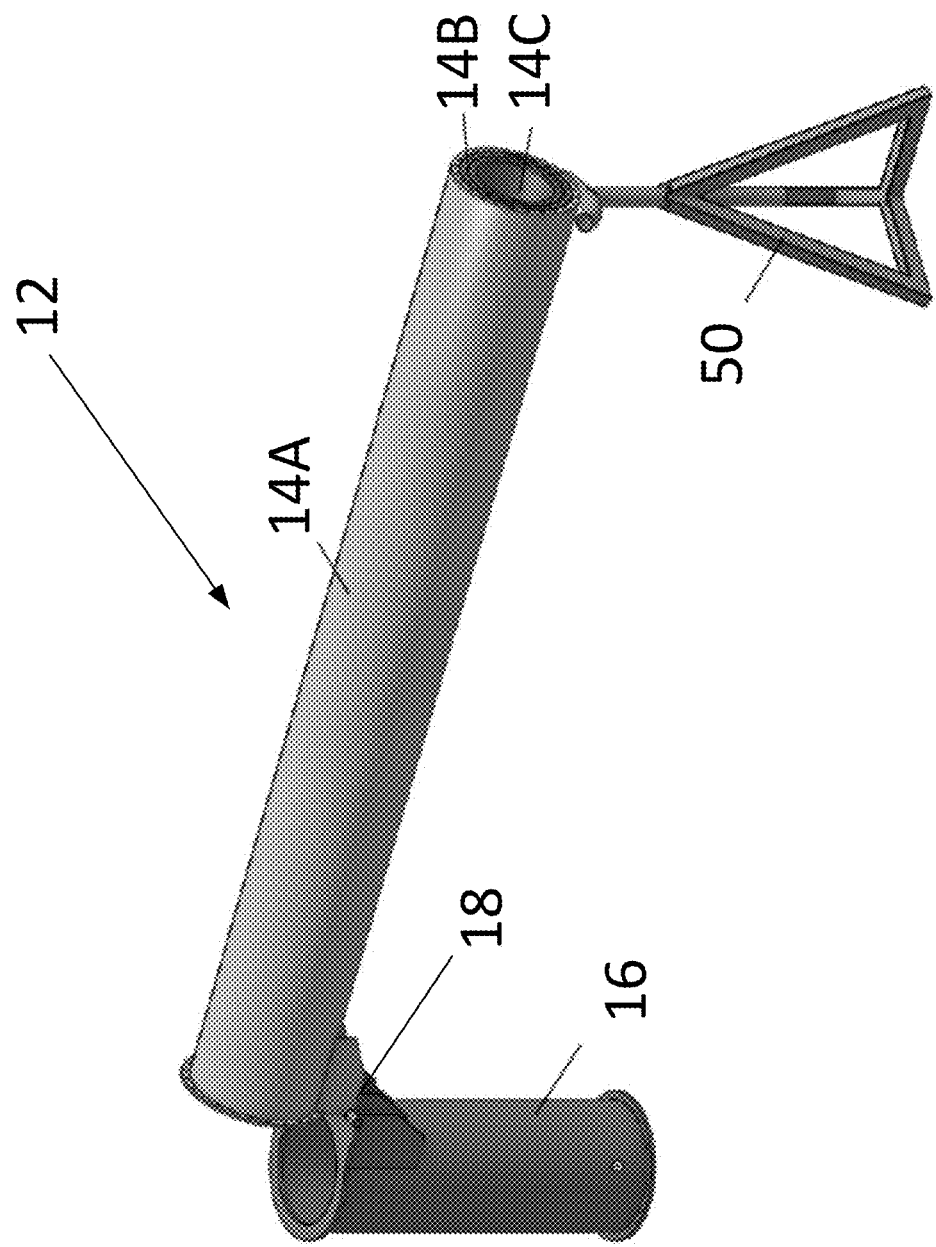
FIG. 10 schematically shows the tower attached to the base prior to extraction of the nested sections in accordance with illustrative embodiments of the invention.

Next, step 904 prepares the tower 12 for extraction of the nested sections 14B and 14C. FIG. 10 schematically shows the tower 12 attached to the base 16 prior to extraction of the nested sections 14B and 14C in accordance with illustrative embodiments of the invention. After the tower 12 is removed from the shipping container, the tower 12 is raised (e.g., by a crane) onto the base 16 and affixed in a horizontal orientation. The prior mentioned hinge 18 connects the base 16 to the outermost section 14A. This hinged connection allows the tower 12 to tilt up later in the process. Additionally, a temporary stand 50 may be used to support the cantilevered end of the tower 12. The nested sections 14B and 14C are now ready for extraction.

Figure 11:
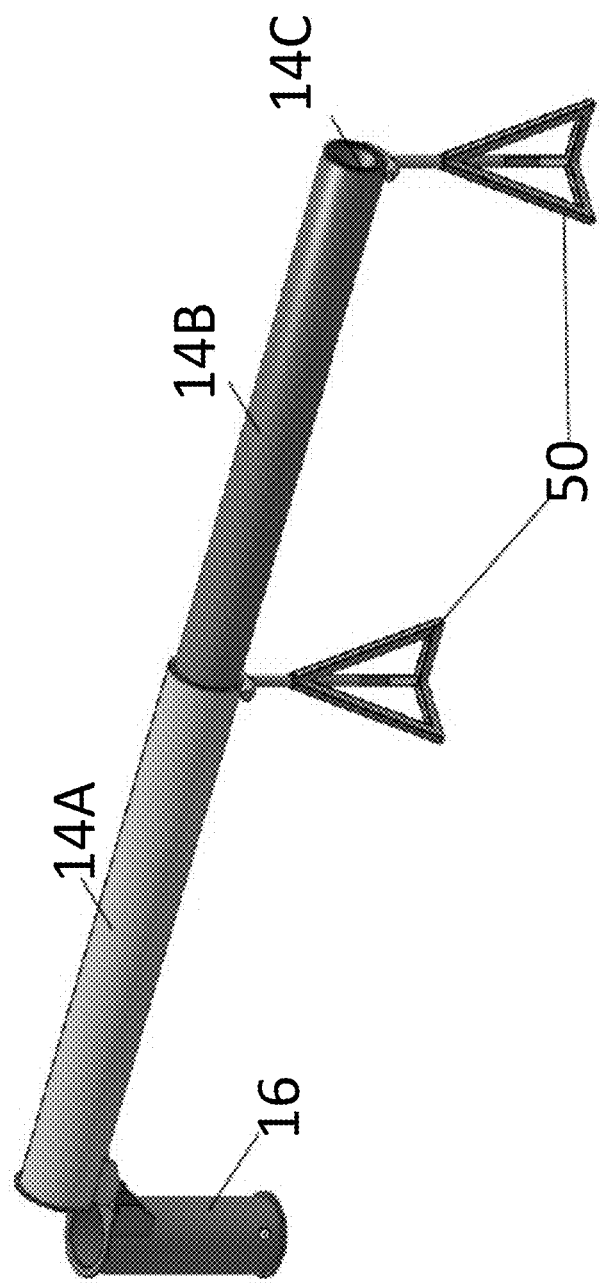
FIG. 11 schematically shows the tower of FIG. 10 with the middle section extracted in accordance with illustrative embodiments of the invention.

Step 906 then extracts the first nested section 14B from the outer section 14A. FIG. 11 schematically shows the tower of FIG. 10 with the middle section 14B extracted in accordance with illustrative embodiments of the invention. The middle section 14B may be extracted from the outer section 14A using a forklift or other material handling equipment. In some embodiments, the middle section 14B may be extracted using a sling fastened to the internal flange 48 at the cantilevered end of the middle section 14B. In a manner similar to the previous step, another temporary stand 50 may be used to support the cantilevered end of the middle section 14B.

Figure 12:
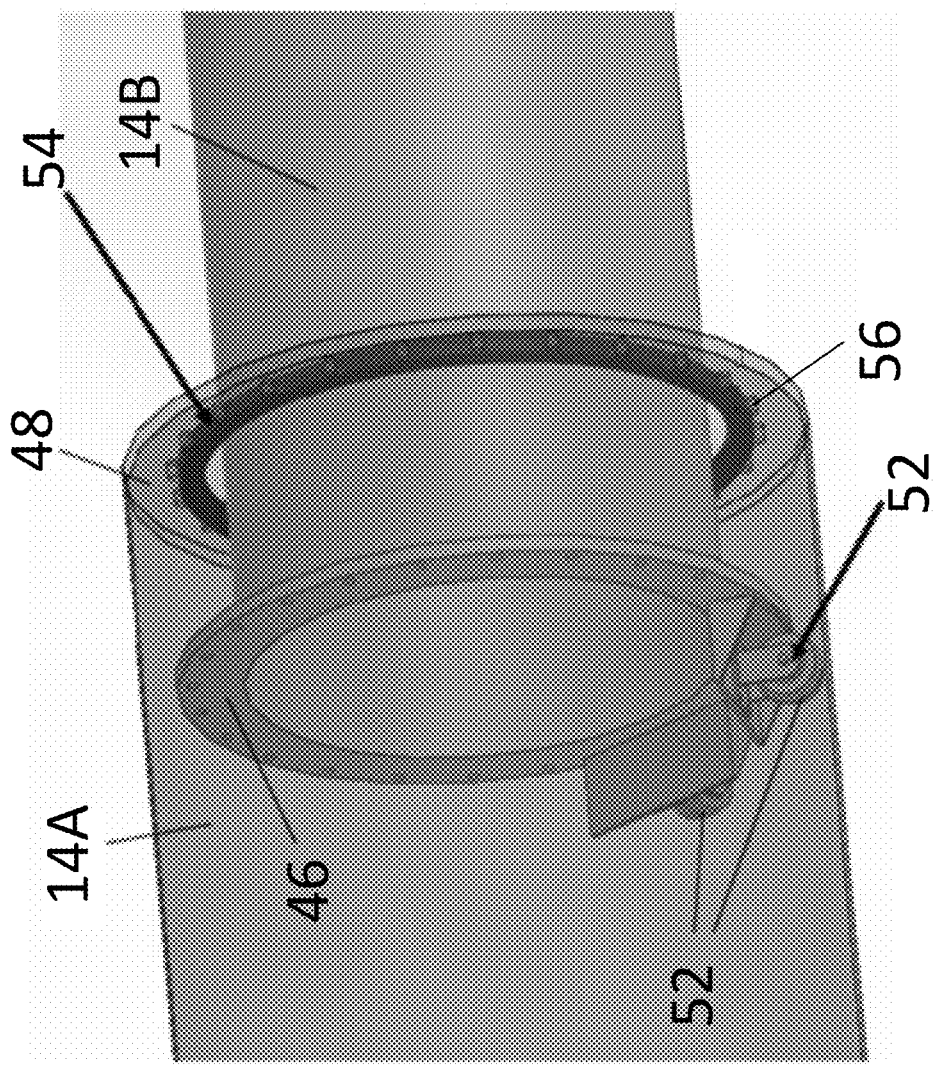
FIG. 12 schematically shows a semi-translucent view of the inner section partially extracted from the outer section in accordance with illustrative embodiments of the invention.

FIG. 12 schematically shows a semi-translucent view of the inner section 14B partially extracted from the outer section 14A in accordance with illustrative embodiments of the invention. The sections 14 may have rollers 52 mounted to it for easy extraction. In addition, the rollers 52 help to prevent friction and damages (e.g. scratches) potentially caused by the internal flange 48 scraping against the outer surface of the extracted section 14B. Furthermore, a temporary protective edging 54 may be fastened to the internal flange 48 to prevent any contact damage during extraction of the inner section 14B.

The rollers 52 may be bolted to the external flange 46 and/or to the outer surface of the extracted section 14B. Although only two rollers 52 are shown in the figure, it should be understood that a plurality of rollers 52 (e.g., 4, 5, 6, 7, 8, 10, etc.) may be used. Furthermore, the rollers 52 may be spread radially around the wall of the section 14B. For example, the rollers 52 may be spaced apart around the section 14B in regular intervals (e.g., 30 degree intervals, 45 degree intervals, 60 degree intervals, 90 degree intervals, etc.). Although rollers 52 are described, the tower sections may use many additional and/or alternative friction reduction members, such as sliders, ball bearings, and/or greased skids.

Next, step 908 bolts the external flange 46 of the extracted section 14B to the internal flange 48 of the outer section 14A. As discussed previously, the nested sections 14 are configured so that upon extraction, the external flange 46 of the inner section 14A is configured to interfere with the internal flange 48 of the outer section 14A. This configuration prevents accidental dislodgement of the extracted section 14B.

Although the flanges 46 and 48 are shown as being circular, it should be understood that the flanges 46 and 48 can take any shape, including but not limited to, square, rectangular, triangular, pentagonal, hexagonal, octagonal, oval, etc. Generally, the shape of the flange 46 and 48 corresponds to the shape of the section 14. A person of skill in the art understands that the tower sections 14 can be conical, tapered, cylindrical, and many other shapes.

Figure 13:
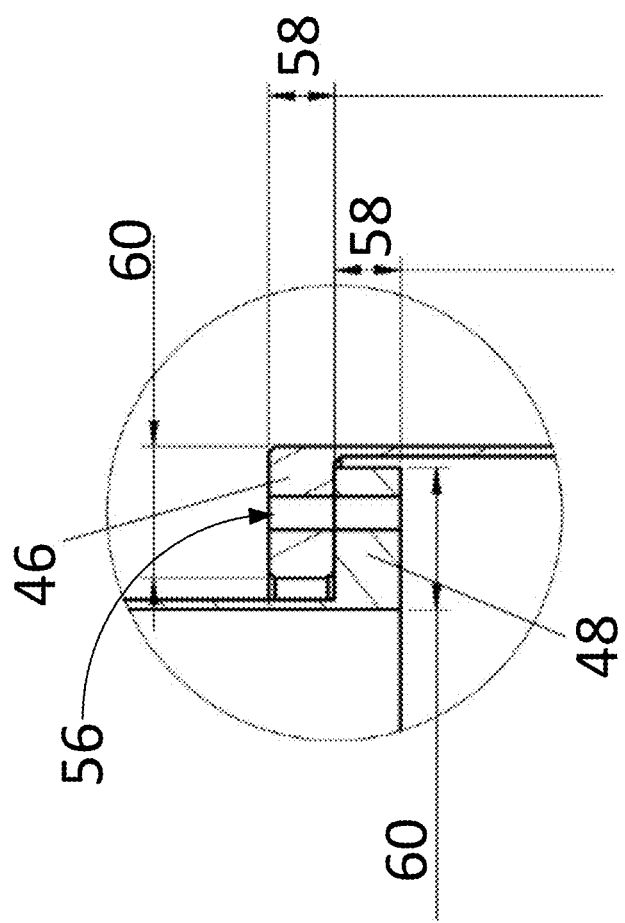
FIG. 13 schematically shows a sectional view of the nested towers flange connection in accordance with illustrative embodiments of the invention.

After the inner section 14B is fully extended, the mating flanges 46 and 48 of section 14A and section 14B are fastened with bolts through complementary bolt holes 56. In contrast, conventional towers have sections 14 with flanges that are generally symmetric, i.e., an external flange meets an identically or similarly sized external flange. This arrangement does not allow the sections 14 to be nested within one another, and also does not prevent accidental dislodgement. FIG. 13 schematically shows a sectional view of the flanges of two nested towers in accordance with illustrative embodiments of the invention. As shown in the figure, there is significant interference between the internal flange 48 and the external flange 46. This interference prevents the accidental dislodgement of sections 14B-14C during extraction procedures. Furthermore, the flanges come with bolt holes 56 that are configured to receive bolts for coupling the sections together.

In some embodiments, the flanges 46 and 48 are made of steel and are about 2 inches thick 58. The width 60 of the flanges 46 and 48 may vary based on the number of sections 14. In the nested arrangement, generally the outer section 14A has a wider flange 48 than the middle section 14B, and the middle section 14B has a wider flange than the innermost section 14C. However, in some embodiments, the diameter of the sections 14 may increase towards the top of the tower 12. Additionally, or alternatively, the diameter of the sections 14 may alternate between increased and decreased size (e.g., middle section 14B may be partially nested in outer section 14A and end section 14C).

Figure 14:
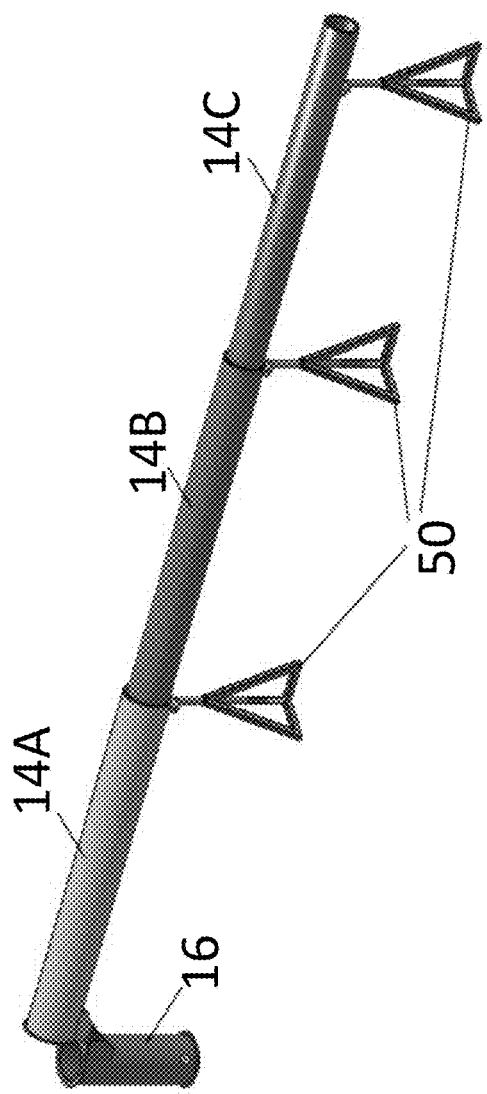
FIG. 14 schematically shows the tower of FIG. 11 with the innermost sections extracted.

Although illustrative embodiments refer to bolting sections 14A and 14B together, it should be understood that a number of ways of attaching sections 14A and 14B may be used. For example, some embodiments may include a frictional connection interface. In some embodiments, the inner wall of the outer section 14A may have a frictional contact surface that makes frictional contact with a counterpart frictional contact surface on the outer wall of the inner section 14B. The frictional interface may be advantageous for illustrative embodiments having conically and/or tapered sections 14. Additionally, or alternatively, bolts may be oriented radially through the overlapping portions of the walls of section 14A and 14B. Step 910 determines whether there are more nested sections 14 to be extracted. If there are, the process loops back to step 906. FIG. 14 schematically shows the tower 12 of FIG. 11 with the innermost section 14C extracted. In a manner similar to what was described previously, the section 14C may be extracted, and an additional temporary assembly stand 50 may be used to support the cantilevered end of the section 14C. The process proceeds to step 908 again, where the flange 48 of the middle section 14B and the flange 46 of the inner section 14C are bolted together. It should be understood that although the process shows bolting as coming prior to extraction of some sections, bolting may take place entirely after all of the sections 14 have been extracted.

Figure 15:
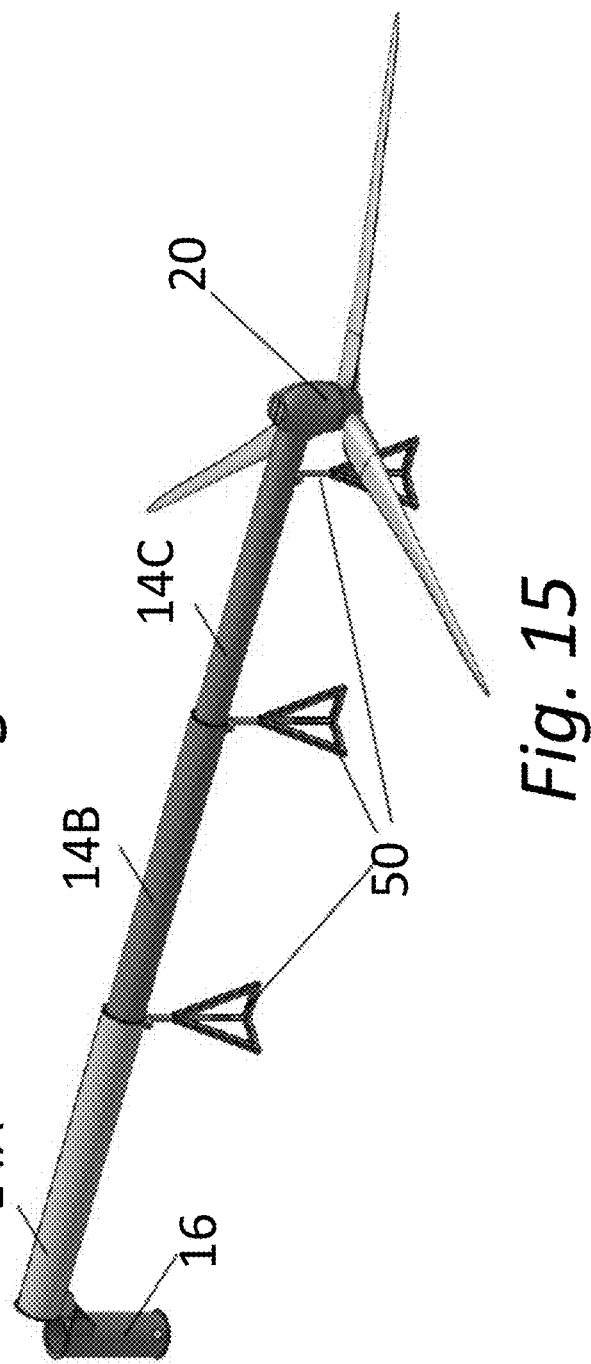
FIG. 15 shows the fully assembled wind turbine in accordance with illustrative embodiments of invention.

When there are no more nested sections 14 to extract, the process continues from step 910 to step 912, which attaches the remaining wind turbine 10 components. FIG. 15 shows the fully assembled wind turbine 10 in accordance with illustrative embodiments of invention. After the tower 12 is fully telescoped and each bolted joint is fastened, the remaining components of the wind turbine 10 may be attached. These components include the rotor, the nacelle 20 assembly, and the blades 22. Accordingly, the turbine 10 is now assembled. In illustrative embodiments where the tower 12 is telescoping, the turbine 12 is considered assembled when the sections 14 are in an extended position (e.g., as shown in FIG. 15), rather than a retracted position (as shown in FIG. 10 and FIG. 11).

Step 914 then attaches installation components to the wind turbine 10. FIG. 2 schematically shows the wind turbine 10 with attached installation components (e.g., the hydraulic cylinders 34 and 36, main body 32, cables 30). As described previously, the fixture 28 may be attached to the tower 12. The fixture 28 may have previously been attached, e.g., during shipping, or it may be attached prior to the tilt-up procedure.

The tension member 30 is attached from the main body 32 to the tower 12. In some embodiments, the section 14C of the tower 12 that is closest to the nacelle 20 has clips configured to couple with the tension member 30. Preferably, the clips are within the strike zone 24. The force generating members (e.g., hydraulics 34 and 36) are attached to the main body 32 of the tilt-up fixture 28 and/or the tower 12.

Finally, step 916 tilts-up the turbine 10. As described previously, the turbine 10 may be titled into its vertical position by hydraulics 34 and 36 or other tilt-up methods. The lifting force tilts the tower 12 around the hinge 18. As the tower 12 begins to tilt-up, the sections 14 are no longer supported by the stand 50. To help counteract the bending moment that would otherwise develop in the tower 12 during tilt-up, illustrative embodiments couple cables 30 within the strike zone 24 (e.g., at the top section 14C, the nacelle 20, or on an attachment above the nacelle 20). Accordingly, the tower 12 favorably may be tilted-up without the need for additional structural reinforcement. Additionally, or alternatively, the main body 32 distributes the consequential force produced by the lifting force (e.g., cylinders 34 and 36). As shown in FIG. 2, the main body 32 distributes the force on the tower 12 (e.g., at flange 46 and 48 connections), reducing the stress on any single or other focused point of the tower 12.

After the tower 12 is tilted up, 918 optionally removes the installation equipment from the strike zone 24. For example, before the turbine 10 is started, maintenance staff may climb the tower 12 using the ladder 13 and remove the cables 30. Alternatively, the staff may position the cables 30 so that they are tight against the tower 12 and out of the strike zone 24. In some embodiments, the remaining installation equipment may be removed as well, e.g., the fixture 28 (e.g., the main body 32 and/or the tension member 30). The turbine 10 is then ready for operation.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A method of assembling a wind turbine, the method comprising:
   providing a nested wind tower in a non-vertical orientation, the nested wind tower having a plurality of wind tower sections including a first inner wind tower section radially inward of an outer wind tower section, each of the wind tower sections having:
   (i) a wall with an inner surface and an outer surface, and
   (ii) a bottom end and a top end,
   the first inner wind tower section having a connection interface at or near its bottom end, and
   the outer wind tower section having a counterpart connection interface at or near its top end,
   the wind tower having a friction reduction member configured to reduce friction between the first inner wind tower section and the outer wind tower section as the first inner wind tower section is extracted in a non-vertical orientation;
   extracting, while in the non-vertical orientation, the first inner wind tower section from the outer wind tower section in a telescoping manner until the connection interface contacts the counterpart connection interface; and
   securing the connection interface and the counterpart connection interface together while in the non-vertical orientation.

2. The method as defined by claim 1, wherein the connection interface includes an external flange and the counterpart connection interface includes an internal flange.

3. The method as defined by claim 2, wherein the friction reduction member is attached to the external flange.

4. The method as defined by claim 1, wherein the friction reduction member is configured to reduce frictional contact with the inner surface of the outer wind tower section.

5. The method as defined by claim 1, further comprising forming an assembled wind turbine by attaching a nacelle and blades to the wind tower while it is in the vertical orientation.

6. The method as defined by claim 5, further comprising tilting up the assembled wind turbine to a vertical orientation.

7. The method as defined by claim 6, wherein the assembled wind turbine is tilted up using hydraulic cylinders.

8. The method as defined by claim 1, further comprising: tensioning a tension member that is attached within a strike zone of the assembled wind turbine, such that when the assembled wind turbine is being tilted-up, the tension member counteracts a bending moment caused by the weight of the assembled turbine.

9. The method as defined by claim 1, further comprising mounting a fixture to an outermost section of the wind tower so that the outermost section is suspended by the fixture, the fixture configured to distribute force along the wind tower when it is attached to a hinge and tilted up using a force generating mechanism.

10. The method as defined by claim 9, wherein at least four corners of the fixture having corner castings.

11. The method as defined by claim 9, further comprising shipping the fixture and the nested wind tower attached, to a worksite.

12. The method as defined by claim 1, wherein the friction reduction member comprises a roller, a bearing, a greased skid, and/or a low friction plastic.

13. The method as defined by claim 1, wherein each of the sections is conically shaped and tapers towards the top end, wherein the connection interface comprises a frictional contact surface between the inner wall of the outer section and the outer wall of the inner section.

14. The method as defined by claim 1, further comprising extracting a second inner wind tower section that is radially inward of the first inner wind tower section, the bottom end of the second inner wind tower section having an external flange, and the top end of the first inner wind tower section having an internal flange, the external flange and the internal flange configured to attach to one another when the second inner wind tower section is extracted.

15. The method as defined by claim 14, wherein a second friction reduction member is attached to the external flange of the second inner wind tower section, the second friction reduction member configured to reduce frictional contact with the inner surface of the first inner wind tower section as the second inner tower section while it is extracted in a horizontal or substantially horizontal orientation.

16. A nested wind tower for assembly in a non-vertical orientation, the nested wind tower comprising:
a plurality of wind tower sections including a first inner wind tower section radially inward of an outer wind tower section, each of the wind tower sections having:
(i) a wall with an inner surface and an outer surface, and
(ii) a bottom end and a top end, the first inner wind tower having a connection interface at or near the bottom end, and the outer wind tower section having a counterpart connection interface at or near the top end;
a friction reduction member configured to reduce friction between the outer surface of the first inner wind tower section and the inner surface of the outer wind tower section as the first inner wind tower section is extracted in a non-vertical orientation;
the connection interface and the counterpart connection interface configured to secure to one another when the first inner wind tower section is extracted in the non-vertical orientation.

17. The nested wind tower of claim 16, further comprising a second inner wind tower section radially inward of the first inner wind tower section, the bottom end of the second inner wind tower section having a connection interface, and the top end of the first inner wind tower section having a counterpart connection interface;
a second friction reduction member configured to reduce friction between the outer surface of the second inner wind tower section and the inner surface of the first inner wind tower section as the second inner wind tower section is extracted in a non-vertical orientation;
the connection interface and the counterpart connection interface configured to secure to one another when the second inner wind tower section is extracted.

18. The nested wind tower of claim 17, further comprising a fixture having:
a main body configured to removably attach to i) the outer wind tower section and ii) a force generating member so as to distribute force from a force generating member during a tilt-up procedure; and
a tension member coupled with the main body, the tension member configured to attach with a strike zone of the wind tower so as to counteract a bending moment caused by the weight of the assembled turbine when the wind tower is tilted up.

19. The nested wind tower of claim 18, wherein at least four corners of the main body have corner castings.

20. The nested wind tower of claim 18, wherein the fixture is removable.

21. A method of assembling a wind turbine, the method comprising:
providing a nested wind tower in a horizontal orientation, the nested wind tower having a plurality of wind tower sections including a first inner wind tower section radially inward of an outer wind tower section, each of the wind tower sections having:
(i) a wall with an inner surface and an outer surface, and
(ii) a bottom end and a top end,
the first inner tower section having means for connecting to the outer wind tower section, and
the outer wind tower section having means for connecting to the first inner wind tower section,
the wind tower section having means for reducing friction as the first inner wind tower section is extracted in a horizontal or substantially horizontal orientation;
extracting the first inner wind tower section from the outer wind tower section in a telescoping manner until the connection interface contacts the counterpart connection interface;
securing the connection interface and the counterpart connection interface together while in the horizontal or substantially horizontal orientation.

* * * * *